(12) United States Patent
Peng et al.

(10) Patent No.: US 8,713,772 B2
(45) Date of Patent: May 6, 2014

(54) FASTENING DEVICE MANUFACTURING FASTENING SYSTEM

(75) Inventors: Ying-Jun Peng, Shenzhen (CN); Xiu-De Zhang, Shenzhen (CN); Zuo-Lin Gao, Shenzhen (CN); Zhi-Cai Guo, Shenzhen (CN); Xue-Hua Lei, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 305 days.

(21) Appl. No.: 13/048,030

(22) Filed: Mar. 15, 2011

(65) Prior Publication Data

US 2011/0236155 A1 Sep. 29, 2011

(30) Foreign Application Priority Data

Mar. 26, 2010 (CN) .......................... 2010 1 0133528

(51) Int. Cl.
*B23P 19/04* (2006.01)
*B21J 15/12* (2006.01)
*B23P 11/00* (2006.01)

(52) U.S. Cl.
USPC .... 29/243.53; 29/243.54; 29/509; 72/453.17; 72/453.19

(58) Field of Classification Search
USPC .......... 72/453.17, 453.19; 29/243.53, 243.54, 29/509, 525.2

See application file for complete search history.

(56) References Cited

U.S. PATENT DOCUMENTS

| | | | | |
|---|---|---|---|---|
| 3,562,893 A | * | 2/1971 | Winslow et al. | |
| 4,306,348 A | * | 12/1981 | Hang et al. | 29/432.2 |
| 5,060,362 A | * | 10/1991 | Birke et al. | 29/525.06 |
| 5,329,691 A | * | 7/1994 | Roberts et al. | 29/705 |
| 6,488,144 B2 | * | 12/2002 | Winkelman et al. | 198/844.2 |
| 6,546,609 B1 | * | 4/2003 | Lee et al. | 29/243.53 |

FOREIGN PATENT DOCUMENTS

JP 9144745 A 6/1997

* cited by examiner

*Primary Examiner* — David B Jones
(74) *Attorney, Agent, or Firm* — Novak Druce Connolly Bove + Quigg LLP

(57) ABSTRACT

A fastening device for manufacturing a fastening system is disclosed. The fastening system includes a first connecting member, a second connecting member, a rivet riveting the first connecting member and the second connecting member together, and an elastic member compressed by the rivet. The fastening device includes a rivet head forming tool, a positioning assembly positioning the first connecting member, a first driving assembly driving the rivet head forming tool to move, a second driving assembly driving the second connecting member to rotate, and a force measuring module. The force measuring module is configured for measuring the positive pressing force between the first connecting member and the second connecting member, and generating a control signal to stop the first driving assembly and the second driving assembly when the positive pressing force between the first connecting member and the second connecting member reach the predetermined force.

10 Claims, 5 Drawing Sheets

FASTENING DEVICE MANUFACTURING FASTENING SYSTEM

BACKGROUND

1. Technical Field

The present disclosure relates generally to fastening technologies and, more particularly, to a fastening system using an elastic member and a fastening device for manufacturing the same.

2. Description of Related Art

A commonly used fastening system includes two connecting members attached to each other by a rivet. A fastening device for forming the fastening system includes a rivet head forming tool, a positioning assembly, and a driving assembly. The positioning assembly positions the connecting members, and the driving assembly drives the rivet head forming tool to apply the rivet, deforming an end thereof to fix the two connecting members together. A positive pressing force between the two connecting members is determined by a moving distance of the rivet head forming tool. However, the connecting members and the rivet often experience size variations, thus the positive pressing force between the connecting members may not be controllable, whereby the fastening system is inconvenient to use.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
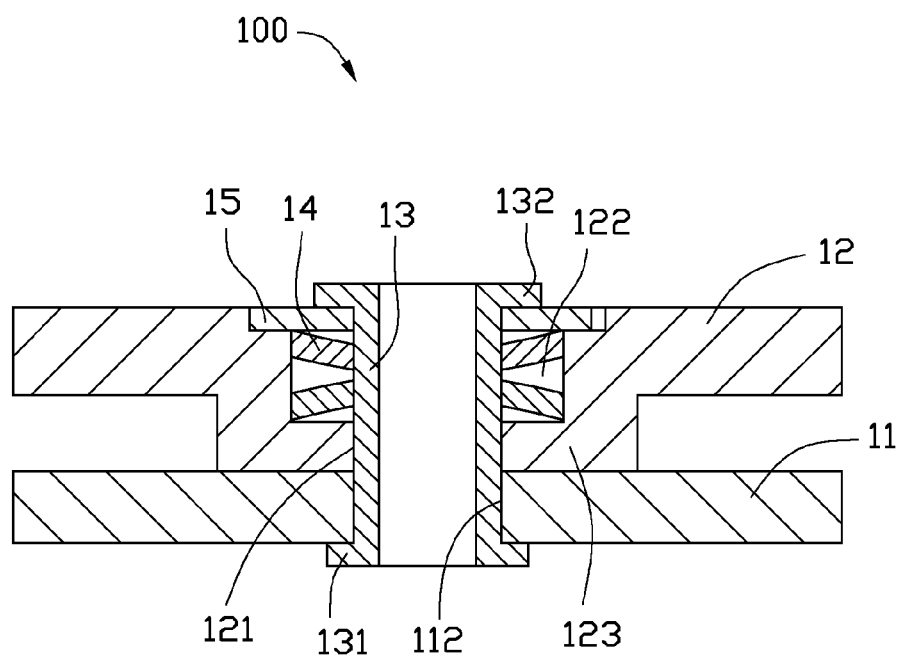
FIG. 1 is a cross-section of an exemplary embodiment of a fastening system.
Figure 2:
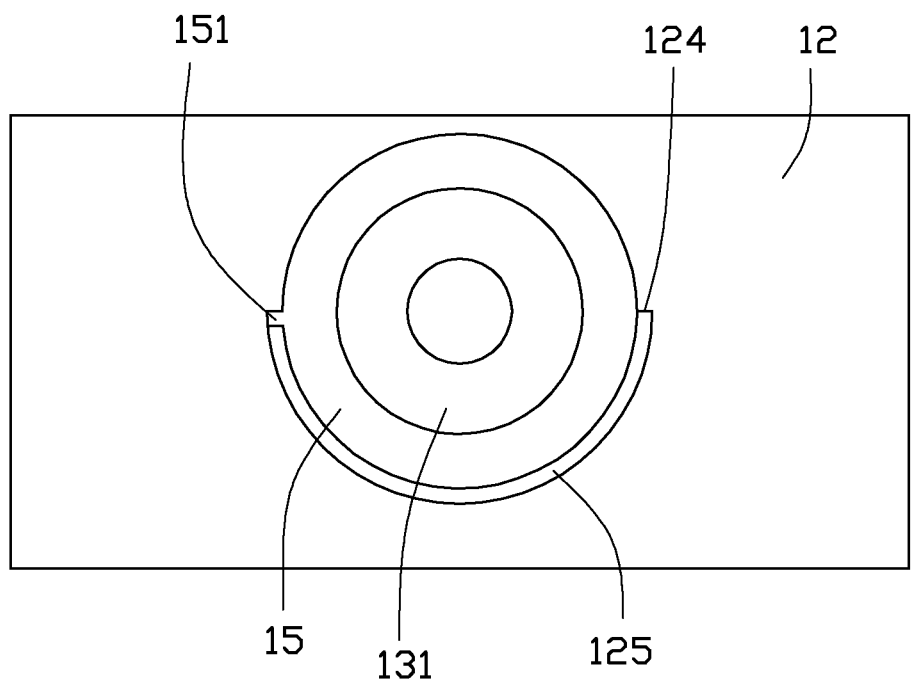
FIG. 2 is a top view of the fastening system of FIG.1.

Referring to FIGS. 1 and 2, an exemplary embodiment of a fastening system 100 includes a first connecting member 11, a second connecting member 12, and a rivet 13 connecting the first connecting member 11 and the second connecting member 12.

The first connecting member 11 defines a first connecting hole 112 in a center portion. The second connecting member 12 forms a connecting protrusion 123 attached to the first connecting member 11, and defines a receiving groove 122 corresponding to the connecting protrusion 123. The connecting protrusion 123 defines a second connecting hole 121 communicating with the receiving groove 122. An elastic member 14 is received in the receiving groove 122. In the illustrated exemplary embodiment, the elastic member 14 is a butterfly spring In the illustrated exemplary embodiment, the rivet 13 is a hollow tube, and forms a head portion 131 at an end. The rivet 13 extends through the first connecting hole 112 of the first connecting member 11, and the second connecting hole 121 of the second connecting member 12, until the head portion 131 contacts the first connecting member 11. An end of rivet 13 away from the head portion 131 is deformed to form a riveting flange 132. Then, the elastic member 14 is compressed by the riveting flange 132, thereby adjusting the positive pressing force between the first connecting member 11 and the second connecting member 12. Because a positive pressing force between the first connecting member 11 and the second connecting member 12 is determined by the positive pressing therebetween, the positive pressing force can correspond to a predetermined force after the rivet 13 is riveted.

The fastening system 100 can also include a restricting member 15 sleeved on the rivet 13 between the elastic member 14 and the riveting flange 132. The restricting member 15 forms a restricting protrusion 151 (see FIG. 2). The second connecting member 12 forms two limiting portions 124 (see FIG. 2) limiting a rotating angle of the restricting member 15. In the illustrated exemplary embodiment, the second connecting member 12 defines a curved guide groove 125 for slidably receiving the restricting protrusion 151. The limiting portions 124 are formed at two ends of the guide groove 125.

Figure 3:
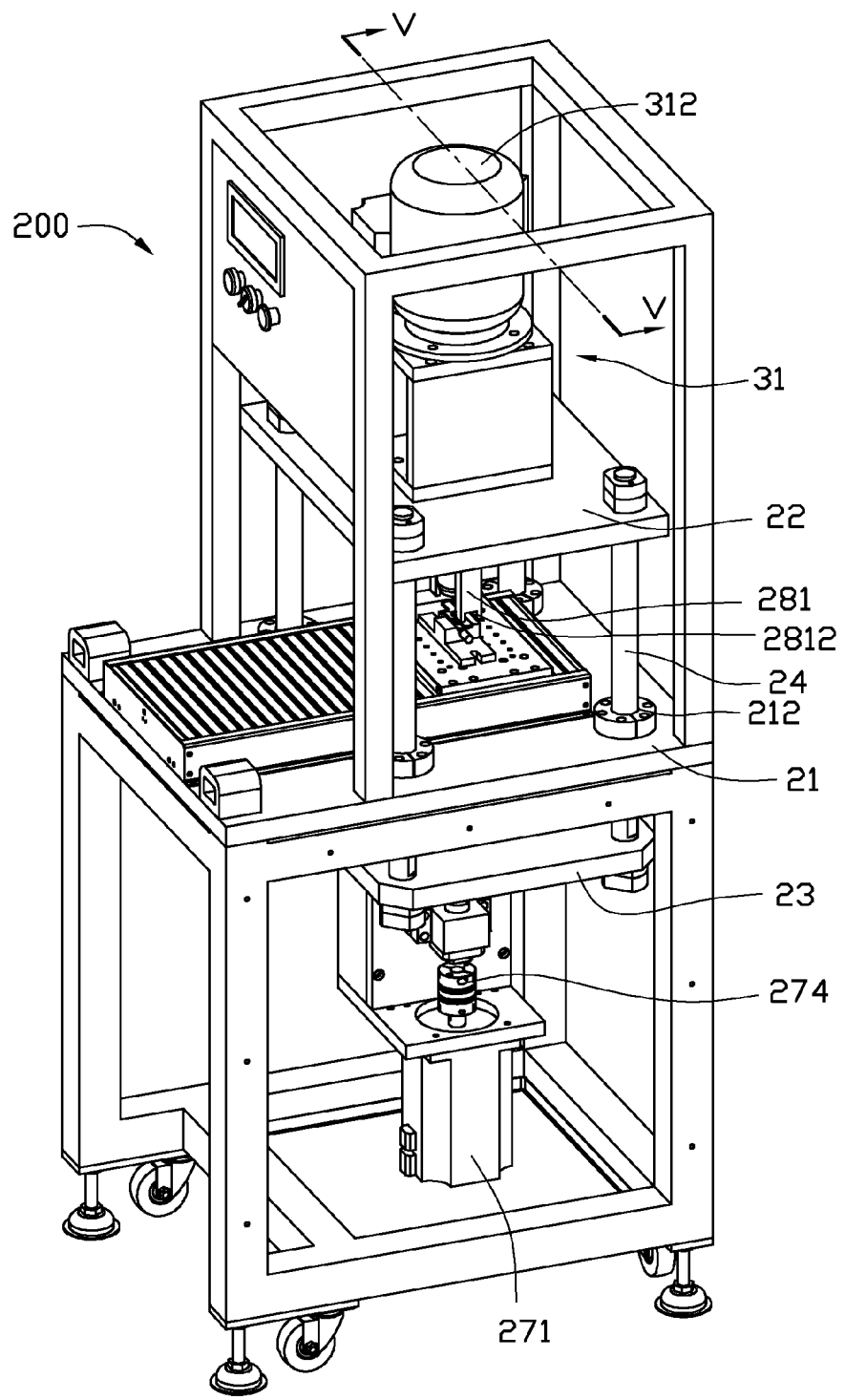
FIG. 3 an isometric view of an exemplary embodiment of a fastening device.
Figure 4:
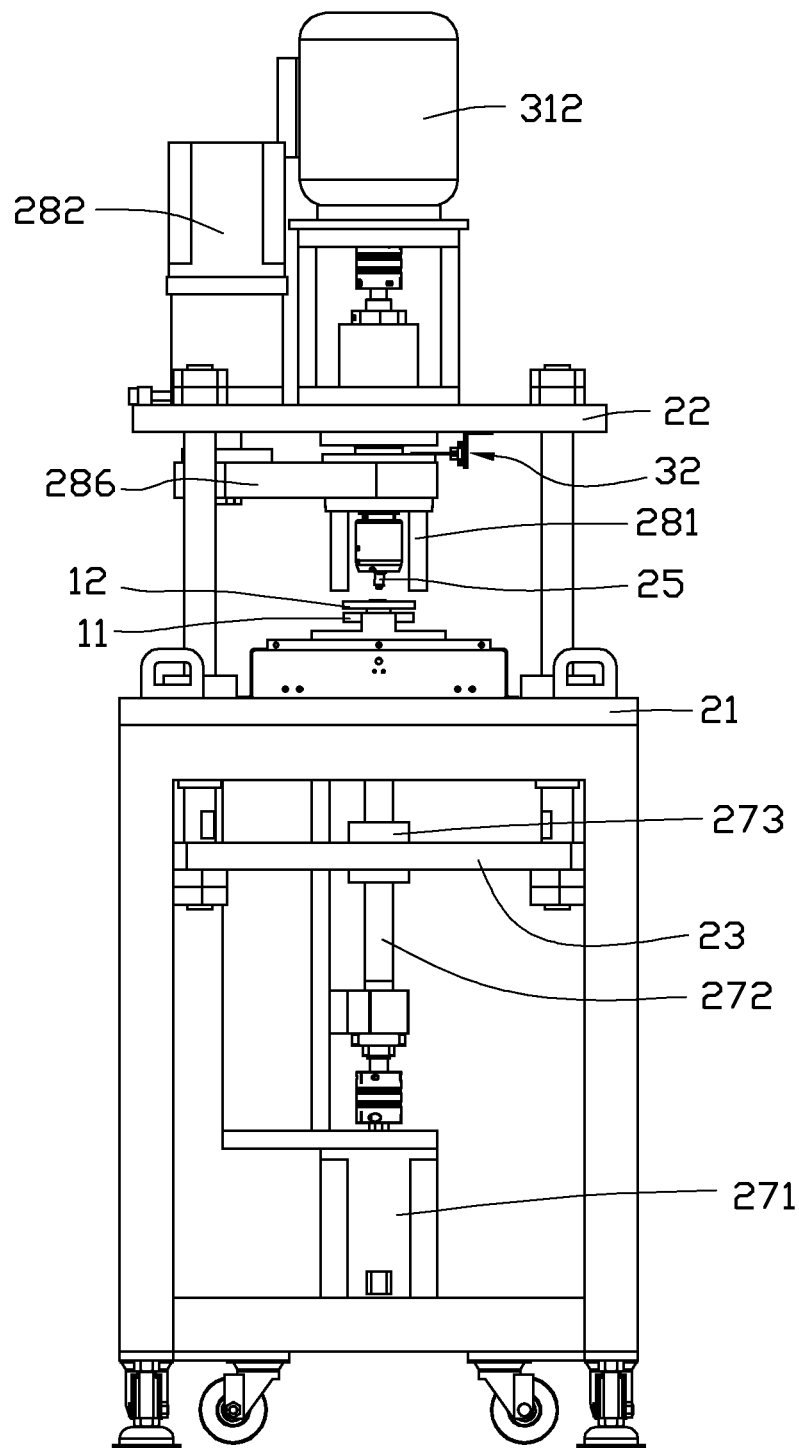
FIG. 4 is a main view of the fastening device of FIG. 3.
Figure 5:
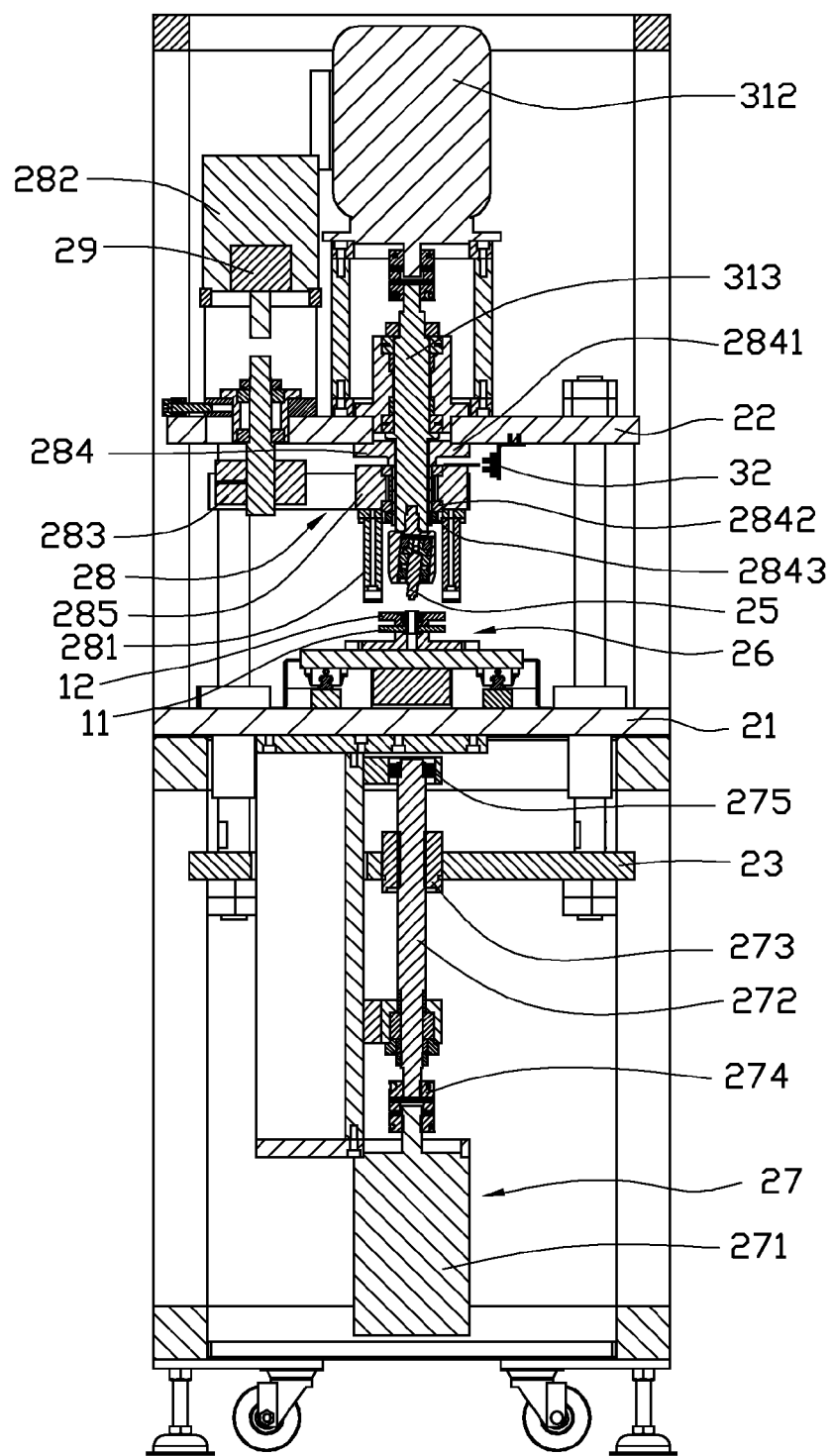
FIG. 5 is a cross-section of the fastening device of FIG.3, taken along the line V-V.

Referring to FIGS. 3 through 5, a fastening device 200 for manufacturing the fastening system 100 is provided. The fastening device 200 includes a support platform 21, and a top platform 22, a bottom platform 23, guide posts 24, a rivet head forming tool 25, a positioning assembly 26, a first driving assembly 27, a second driving assembly 28, and a force measuring module 29. The support platform 21 is positioned between the top platform 22 and the bottom platform 23. The guide posts 24 connect the top platform 22 to the bottom platform 23. The rivet head forming tool 25 is fixed on the top platform 22. The positioning assembly 26 is fixed on the support platform 21. The first driving assembly 27 is connected to the bottom platform 23.

The second driving assembly 28 can rotate the second connecting member 12 relative to the first connecting member 11 during a riveting process. The force measuring module 29 can test the positive pressing force between the first connecting member 11 and the second connecting member 12. When the positive pressing force reaches a desired value, the force measuring module 29 stops the first driving assembly 27 and second driving assembly 28.

The support platform 21 defines guide holes 212. The guide posts 24 extend through the guide holes 212 of the support platform 21 whereby the top platform 22 and the bottom platform 23 can slide relative to the support platform 21. There may be four guide posts and corresponding guide holes.

In the illustrated exemplary embodiment, the rivet head forming tool 25 is rotated by a rotating assembly 31 during the riveting process. The rotating assembly 31 includes a driving motor 312 and a rotatable shaft 313 connected to the driving motor 312. The driving motor 312 is fixed on the top platform 22. The rivet head forming tool 25 is angled on an end of the rotatable shaft 313 under the top platform 22.

The first driving assembly 27 can move the rivet head forming tool 25. The first driving assembly 27 includes a driving motor 271, a threaded rod 272, and a ball nut 273. The threaded rod 272 extends through the bottom platform 23. An end of the threaded rod 272 is coupled to the driving motor 271 via a coupling, and the other end of the threaded rod 272 is connected to the support platform 21 via a bearing 275. The ball nut 273 is fixed to the bottom platform 23.

The second driving assembly 28 includes two driving fingers 281, a driving motor 282, an active pulley 283, a connector 284, a passive pulley 285, and a timing belt 286. The active pulley 283 is coupled to the driving motor 282. The connector 284 is fixed on the top platform 22. The passive pulley 285 is rotatably connected to the connector 284. The timing belt 286 is sleeved on the active pulley 283 and the passive pulley 285. The driving motor 282 and the active pulley 283 are positioned on opposite sides of the top platform 22. The driving fingers 281 is fixed to the passive pulley 285, and defines an limiting groove 2812 for grasping the second connecting member 12. In the illustrated exemplary embodiment, the force measuring module 29 is positioned in the driving motor 282. The force measuring module 29 can also be positioned outside of the driving motor 282.

The connector 284 includes a sleeve 2841, a bearing 2842, a locking member 2843. The bearing 2842 is sleeved on the sleeve 2841. The locking member 2843 positions the passive pulley 285 at a fixed height. The rivet head forming tool 25 is fixed on the sleeve 2841, and positioned between the driving fingers 281.

The fastening device 200 can also have a rotating angle measuring module 32, configured for measuring a rotating angle of the second connecting member 12 relative to the first connecting member 11. When the rotating angle of the second connecting member 12 reaches a predetermined value, the rotating angle measuring module 32 generates a control signal to stop the second driving assembly 28. In addition, the fastening device 200 can also have a control display (not shown), thereby easily controlling the rivet head forming tool 25, the first driving assembly 27, and the second driving assembly 28.

A manufacturing process of manufacturing the fastening system 100 by the fastening device 200 follows.

The second connecting member 12 is positioned on the first connecting member 11. The elastic member 14 and the restricting member 15 are received in the receiving groove 122 of the second connecting member 12. The rivet 13 extends through the first connecting member 11 and the second connecting member 12. The first connecting member 11 is positioned on the positioning assembly 26. The driving motors 271, 312 are started, whereby the rivet head forming tool 25 rotates and axially moves. The second driving assembly 28 moves following the rivet head forming tool 25. When the rivet head forming tool 25 touches the rivet 13, the driving fingers 281 grasp the second connecting member 12. Driving motor 282 is started to rotate the driving fingers 281. As a result, the second connecting member 12 is rotated relative to the first connecting member 11, and a friction force is generating between the first connecting member 11 and the second connecting member 12.

The rivet head forming tool 25 further move downwards, and then an end of the rivet 13 extending out of the second connecting member 12 is deformed to form the riveting flange 132. The elastic member 14 is continuously compressed by the riveting flange 132. Thus, the friction force and the positive pressing force between the first connecting member 11 and the second connecting member 12 gradually increase. The force between the first connecting member 11 and the second connecting member 12 is transmitted to the force measuring module 29 in the driving motor 282 via the active pulley 283, the passive pulley 285, and the timing belt 286. When the positive pressing force is equal to the predetermined force, the force measuring module 29 generates a control signal to stop the driving motors 271, 312. Therefore, the fastening system 100 can obtained the predetermined positive pressing force.

It is believed that the present exemplary embodiments and their advantages will be understood from the foregoing description, and it will be apparent that various changes may be made thereto without departing from the spirit and scope of the disclosure or sacrificing all of its material advantages.

What is claimed is:

1. A fastening device for manufacturing a fastening system, the fastening system comprising a first connecting member, a second connecting member, a rivet, and an elastic member, the second connecting member positioned on the first connecting member, the rivet riveting the first connecting member and the second connecting member together, the elastic member received in the second connecting member, and compressed by the rivet to generate a predetermined positive pressing force between the first connecting member and the second connecting member, the fastening device comprising:

a rivet head forming tool configured for deforming an end of the rivet;

a positioning assembly located opposite to the rivet head forming tool, the positioning assembly being configured for positioning the first connecting member;

a first driving assembly connected to the rivet head forming tool, and capable of driving the rivet head forming tool to move towards the positioning assembly;

a second driving assembly located above the positioning assembly, the second driving assembly being configured for driving the second connecting member rotate relative to the first connecting member; and a force measuring module connected to the second driving assembly, the force measuring module being configured for measuring the positive pressing force between the first connecting member and the second connecting member, and generating a control signal to stop the first driving assembly and the second driving assembly when the positive pressing force between the first connecting member and the second connecting member reach the predetermined force.

2. The fastening device of claim 1, further comprising a support platform, a top platform, a bottom platform, and a plurality of guide posts, the support platform is positioned between the top platform and the bottom platform, the guide posts connects the top platform to the bottom platform, the rivet head forming tool and the second driving assembly are fixed on the top platform, the positioning assembly is fixed on the support platform, and the first driving assembly is fixed to the bottom platform.

3. The fastening device of claim 2, wherein the second driving assembly comprises at least one finger and a driving motor, the driving motor is fixed on the top platform, and the at least one finger is rotatably connected to the driving motor, the driving motor is capable of rotating the at least one finger.

4. The fastening device of claim 3, wherein the second driving assembly further comprises an active pulley, a connector, a passive pulley, and a timing belt, the active pulley is coupled to the driving motor, the connector is fixed on the top platform, the passive pulley is rotatably connected to the connector, and the timing belt is sleeved on the active pulley and the passive pulley, the at least one finger is fixed to the passive pulley.

5. The fastening device of claim 4, wherein the connector comprises a sleeve, a bearing, a locking member, the bearing is sleeved on the sleeve, the locking member positions the passive pulley at a fixed height, the rivet head forming tool is fixed on the sleeve.

6. The fastening device of claim 4, wherein the force measuring module is received in the driving motor of the second driving assembly.

7. The fastening device of claim 2, wherein the first driving assembly comprises a driving motor, a threaded rod, and a ball nut, an end of the threaded rod is coupled to the driving motor, and the other end of the threaded rod is connected to the support platform, and the ball nut is fixed to the bottom platform.

8. The fastening device of claim 2, further comprising a rotating assembly connected to the rivet head forming tool, and capable of rotating the rivet head forming tool, the rotating assembly comprises a driving motor and a rotatable shaft connected to the driving motor, the driving motor is fixed on the top platform, the rivet head forming tool is fixed on the rotatable shaft.

9. The fastening device of claim 8, wherein the rivet head forming tool is angled on an end of the rotatable shaft.

10. The fastening device of claim 1, further comprising a rotating angle measuring module for measuring a rotating angle of the second connecting member relative to the first connecting member.

\* \* \* \* \*